2 Sheets—Sheet 1.

W. H. THURMOND.

CAR COUPLING.

No. 10,623. Reissued July 7, 1885.

Attest
W. E. Poulter
Paul M. Knobloch

Inventor,
William H. Thurmond,
per Henry Mh
his atty

THE NORRIS PETERS CO., PHOTO-LITHO., WASHINGTON, D. C.

W. H. THURMOND.

CAR COUPLING.

No. 10,623. Reissued July 7, 1885.

Attest
W. E. Poulter
Paul M. Knobloch

Inventor
William H. Thurmond
Henry Orth
his atty

THE NORRIS PETERS CO., PHOTO-LITHO., WASHINGTON, D. C.

UNITED STATES PATENT OFFICE.

WILLIAM H. THURMOND, OF FORSYTH, GEORGIA.

CAR-COUPLING.

SPECIFICATION forming part of Reissued Letters Patent No. 10,623, dated July 7, 1885.

Original No. 306,876, dated October 21, 1884. Application for reissue filed May 2, 1885.

*To all whom it may concern:*

Be it known that I, WILLIAM H. THURMOND, a citizen of the United States, residing at Forsyth, in the county of Monroe and State of Georgia, have invented certain new and useful Improvements in Car-Couplers; and I do hereby declare the following to be a full, clear, and exact description of the invention, such as will enable others skilled in the art to which it appertains to make and use the same.

This invention relates to car-couplings; and the novelty consists in the construction, arrangement, and adaptation of parts, as will be more fully hereinafter set forth, and specifically pointed out in the claims.

The invention is designed as an improvement upon the device patented to me December 4, 1883, No. 289,729, and it is illustrated in the accompanying drawings, which form a part of this specification, and in which—

Figure 1:
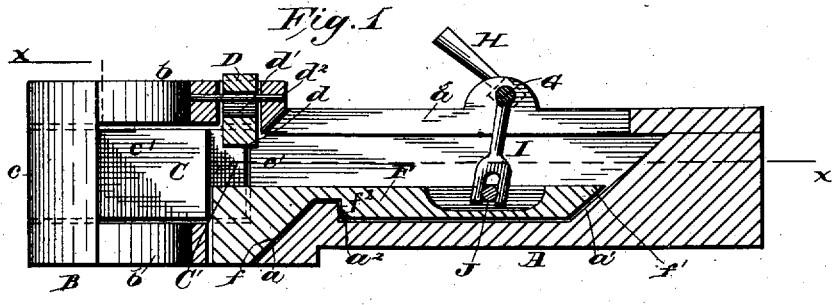
Figure 2:
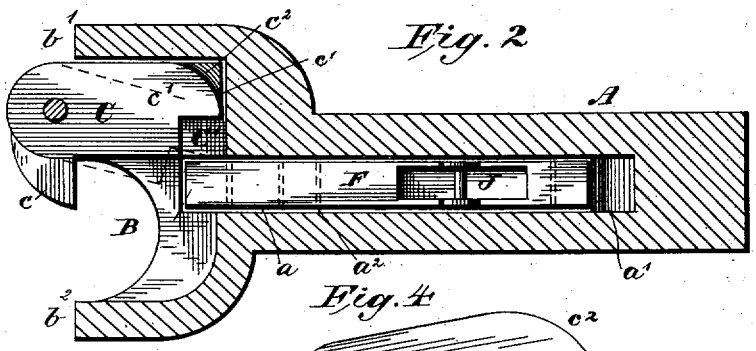
Figure 4:
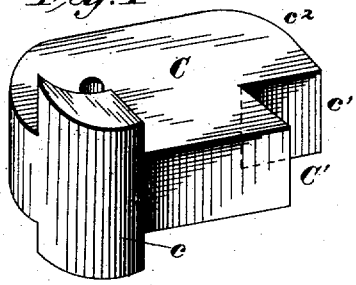
Figure 3:
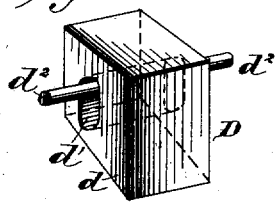
Figure 5:
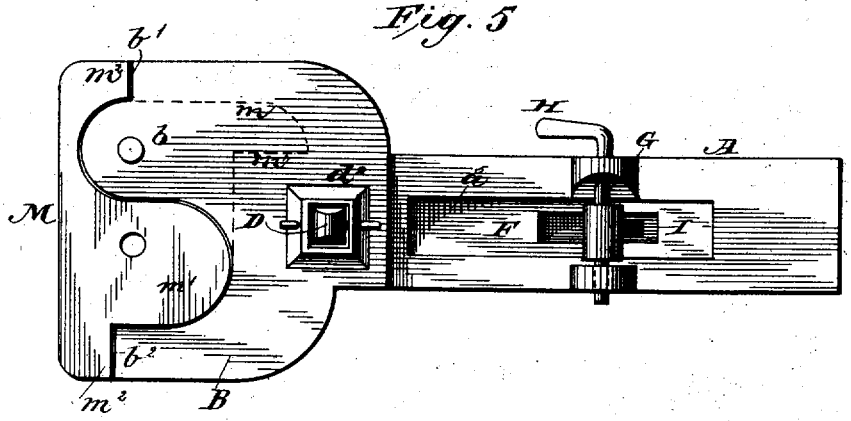
Figure 6:
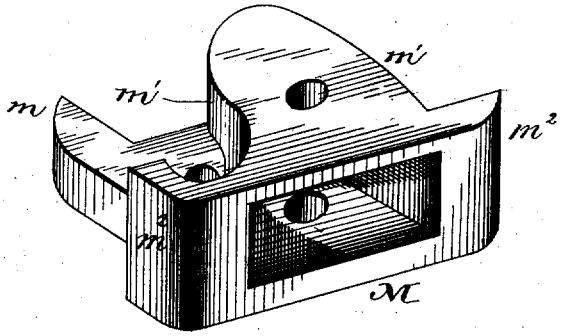

Figure 1 is a longitudinal vertical section; Fig. 2, a horizontal section on the line $x\ x$ of Fig. 1. Fig. 3 is a perspective detail of the gravital locking-plug; Fig. 4, a detail perspective of the locking-jaw. Fig. 5 is a top plan view showing the draw-head in Fig. 2 in connection with an interchangeable or detachable mouth-piece, adapting the draw-head to a link-and-pin coupling; and Fig. 6 is a detail perspective of said detachable mouth-piece removed.

For convenience, I have shown but one draw-bar and attachments, and I will describe the invention accordingly; but it will be understood that another draw-bar of similar construction is contemplated.

The object of the invention is to produce an efficient car-coupling at small expense, and one which shall be simple in construction and operation, having few moving parts, and hence not liable to get out of operation, and to have the locking features operated by gravity—a power which is always in operation when the cars are in a position to be coupled.

Referring to the drawings, in which similar letters of reference indicate like parts in all the figures, A designates the draw-bar, cast preferably in a single piece, with a longitudinal cavity and a slot, $a^5$, above.

Between ears $b$ of the head B of the draw-bar is pivoted a horizontally-oscillating coupling-jaw, C, having a hook portion, $c$, and a tail portion, $c'$, at right angles to each other, as shown. This jaw C has a beveled portion, $c^2$, which portion $c^2$, as the jaw is oscillated in one direction, strikes a similar bevel, $d$, upon a vertically-moving gravital plug, D, having a slot, $d'$, in which operates a guide-pin, $d^2$, to limit its action and to keep it in its cavity in the draw-bar. The lower surface of the draw-bar—that is to say, the floor of its cavity—is provided with two surfaces, $a$ and $a'$, inclined in the same direction, and an abutting shoulder, $a^2$. This form corresponds with the lower surface of the thrust-bar F, the inclines $f$ and $f'$ being adapted to ride up the inclines $a$ and $a'$ when the thrust-bar F is thrust inward in the act of coupling, and the shoulder $f^2$ being adapted to abut against the shoulder $a^2$ to limit its action when it gravitates behind the tail $c'$ of the coupling-jaw. When the thrust-bar F is in its highest position, the gravity-plug D falls to its lowest position, and its rear abrupt side serves to hold the thrust-bar locked in such highest position until it is released by the plug D having been forced up out of contact by the coupling-jaw.

In the patent granted to me, and hereinbefore referred to, the inner face of the tail of the coupling-jaw C is a plane surface, and when the said jaw is forced back to allow the thrust-bar to move forward, the forward end of the latter lies in front of said plane surface and in close proximity thereto, leaving but a limited play to the tail of the coupling-hook.

Although perfectly operative, I prefer to so construct the tail of the coupling-jaw as to allow the thrust-bar to move in front thereof, even in case the latter is not fully pushed back into the draw-head by the entering coupling-hook, thus insuring the coupling under any circumstances. This I accomplish by cutting away or rabbeting the corner of the tail $c'$, as seen at C', thus providing for the free movement of the thrust-bar, and a coupling may be effected upon the sharpest curve, even if the jaw has not been forced entirely home—a matter liable to occur upon a curve. Upon this rabbet feature of the locking-jaw in its relation to the thrust-bar, and upon the locking-plug D in its relation to both jaw and thrust-bar, I base much of the importance and novelty of this invention.

A rock-shaft, G, is operated by a lever, H, to oscillate a bifurcated arm, I, the jaws of which embrace a pin, J, upon the thrust-bar, in substantially the manner in which similar parts were operated in the patent cited, and as these parts form no important feature of this invention, further description will not be necessary.

It will be understood that the hook *c* of one coupling-jaw strikes the tail *c'* of the other, and that the jaws are oscillated until the thrust-bars gravitate into the rabbets C', when the coupling is effectually made and locked.

When it is desired to uncouple, the lever H is manipulated properly to withdraw the thrust-bar against its gravity and up the inclines *a* and *a'* until the plug D falls in front of the thrust-bar, and holds it thus elevated until the next coupling operation occurs, when the jaw, by bringing the inclines $c^2$ and *d* into contact, raises the plug D until the thrust-bar is liberated and gravitates into the rabbet C'. Thus the thrust-bar locks the jaw automatically, the plug locks the thrust-bar, and the jaw releases the thrust-bar by acting on the plug. I provide for the employment of the draw-bar with an ordinary link-and-pin coupling by removing the jaw C and substituting a removable mouth-piece, M, as shown, secured by the same pivot-pin or by another pin acting in the same holes. This mouth-piece M has an arm, *m*, which enters the cavity of the draw-bar, and has a general contour corresponding to that of the draw-bar, as seen at *m'*, to give an extended bearing between the parts.

As described in Letters Patent hereinbefore referred to, the draw-head B has buffer faces *b' b²*, to protect the coupling-hooks and their pivotal connections from injury when two draw-heads come together in coupling. It will be seen that when the mouth-piece is in position, as shown in Fig. 5, its lateral projections, $m^2$, seat against the buffer-faces *b' b²* on opposite sides of the draw-head and afford a firm bearing for said mouth-piece.

The mouth-piece has an ordinary vertical aperture for a coupling-pin, and may be used with link-coupling whenever occasion requires.

What I claim as new is—

1. In a car-coupler of the class described, the combination, with a coupling-hook arranged to oscillate on a vertical pivot, and a thrust-bar having a combined vertical and horizontal gravital movement toward the shank of said hook, of a plug, D, having a gravital movement in the path of the shank of the coupling-hook, in a plane at right angles to the plane of motion of said hook and thrust-bar, substantially as and for the purpose specified.

2. The combination, with the thrust-bar and its operating means, of the locking-jaw C, having part *c*, tail *c'*, and bevel $c^2$, and the gravital plug D, having bevel *d*, as set forth.

3. In combination with the draw-bar A, having inclines *a a'* and shoulder $a^2$, and with the pivoted jaw C, having tail *c'*, with rabbet C' and bevel $c^2$, the thrust-bar F, having inclines *f f'* and shoulder $f^2$, and the gravital plug D, having bevel *d*, as set forth.

In testimony whereof I affix my signature in presence of two witnesses.

WILLIAM H. THURMOND.

Witnesses:

W. D. GIBSON,

S. B. HEAD.